Figure 4:
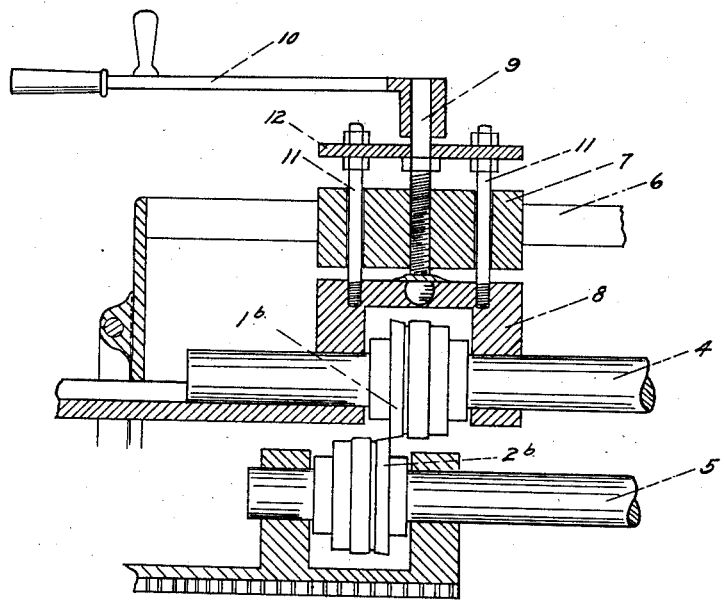

J. P. HEDSTROM.
STRETCHER ROLLS.
APPLICATION FILED NOV. 9, 1909.
1,038,127.
Patented Sept. 10, 1912.
2 SHEETS—SHEET 1.
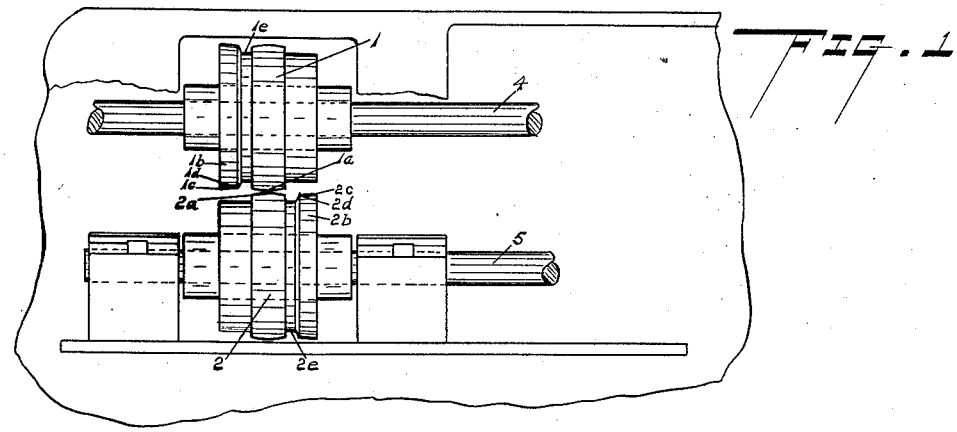
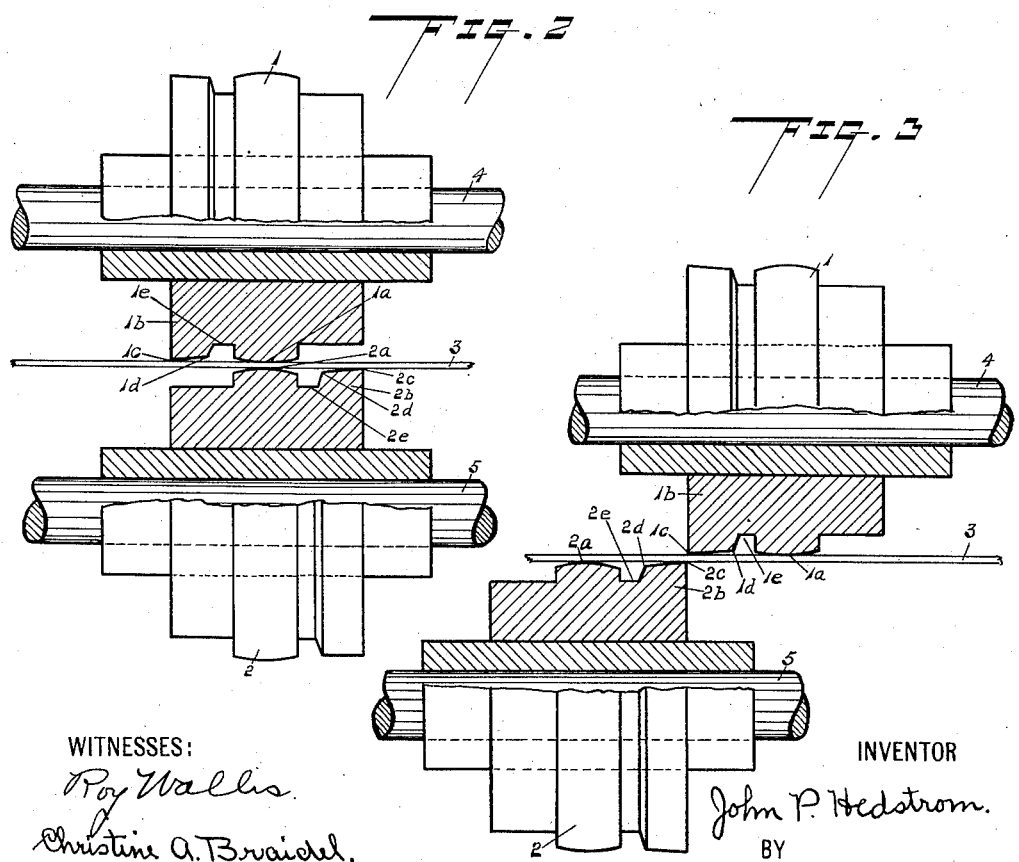
WITNESSES:
Roy Wallis.
Christine A. Braichel.
INVENTOR
John P. Hedstrom.
BY
Geo. B. Willcox. ATTORNEY

J. P. HEDSTROM.
STRETCHER ROLLS.
APPLICATION FILED NOV. 9, 1909.

1,038,127.

Patented Sept. 10, 1912.

2 SHEETS—SHEET 2.

WITNESSES:
Christine A. Braidel.
Geo. W. Smith.

INVENTOR
John P. Hedstrom.
BY
Geo. B. Willcox. ATTORNEY

UNITED STATES PATENT OFFICE.

JOHN P. HEDSTROM, OF BIG RAPIDS, MICHIGAN, ASSIGNOR TO HANCHETT SWAGE WORKS, OF BIG RAPIDS, MICHIGAN, A CORPORATION OF MICHIGAN.

STRETCHER-ROLLS.

1,038,127.      Specification of Letters Patent.      Patented Sept. 10, 1912.

Application filed November 9, 1909. Serial No. 527,017.

*To all whom it may concern:*

Be it known that I, JOHN P. HEDSTROM, a citizen of the United States, residing at Big Rapids, in the county of Mecosta and State of Michigan, have invented certain new and useful Improvements in Stretcher-Rolls; and I do hereby declare the following to be a full, clear, and exact description of the invention, such as will enable others skilled in the art to which it appertains to make and use the same.

This invention relates to stretching rolls for stretching band saws and the like and pertains more particularly to combined stretching and shearing rolls, the object of the invention being to combine with a stretching roll a shearing device that will not in any way interfere with the tensioning device, and to make a shear that will shear the blade straight across without having any tendency to wedge the saw in between the rolls.

Heretofore the rolls for tensioning the saw have been used to a certain extent for also shearing the saw blade, but the tensioning rolls have not been entirely satisfactory for shearing purposes, because the use of the tensioning rolls for shearing is liable to injure them for tensioning purposes. For this reason some types of tensioning machines are provided with an extra set of rolls to be used for shearing only.

It is customary to form the rolls used for tensioning the saws, by grinding the tensioning treads slightly rounding so that they present a slightly crowning surface to the saw. When such tensioning rolls are used for shearing, it has been customary to move one roll past the other by sliding it along its arbor so as to bring the edges opposite each other to make a cutting edge. Because of the fact that the tensioning rolls are crowned, presenting a somewhat conical rather than a cylindrical surface to the saw, there is more or less tendency to bend the saw instead of shearing it, thus tending to wedge the saw blade in between the rollers when the upper roll is forced down past the edge of the lower roll, the saw being presented to the cutting edges of the rolls so as to lie at a slight angle to the axes of the rolls instead of parallel with the axes of the rolls as it should do in order to produce a clean shearing cut without bending the blade. This action of the crowned rolls crumbles the edges of the rolls and spoils them both for tensioning and shearing. I avoid these difficulties and produce a combined tensioning and shearing roll by the means illustrated in the accompanying drawings, in which—

Figure 1 illustrates part of a stretching machine with the rolls in place; Fig. 2 shows the relative positions of the rolls and saw when the rolls are adjusted for stretching; and Fig. 3 shows the same rolls adjusted longitudinally for shearing, but having their axes separated, for the purpose of better illustration. Fig. 4 is a detail of the device for accomplishing the shearing.

1 is the upper roll, 2 the lower roll, and 3 the saw being operated upon.

4 is the arbor of the upper roll and 5 the arbor of the lower roll.

1ª is the crowned stretching tread of the upper roll, and 2ª of the lower roll.

In my improved construction I provide an extension 1ᵇ at one side of the upper roll, and a similar extension 2ᵇ at the opposite side of the lower roll, these extensions having their outer corners 1ᶜ and 2ᶜ extending radially out nearly as far as the crowns 1ª and 2ª that do the tensioning. As shown in Fig. 2, these extending corners do not interfere in any way with the tensioning of the saw, and as shown in Fig. 3 they make a properly formed shear for shearing the blade straight through without any tendency to wedge the saw in between the rolls.

I have illustrated in Fig. 3 the arbors 4 and 5 as being supported sufficiently to permit the plate 3 to pass through the rolls without shearing. It will be understood, however, that suitable means is to be provided to move the arbors 4 and 5 closer together to bring the shearing corners of the rolls into shearing action and also to provide for sliding one of the rolls lengthwise on its shaft to change the relative positions of the rolls from that shown in Fig. 2 to that shown in Fig. 3. One means of accomplishing this result is illustrated in Fig. 4, where 6 is a guide provided on the frame of the machine and carrying a sliding block 7 upon which is adjustably supported a housing 8 that supports the arbor 4. The housing 8 and the arbor 4 are raised and lowered by means of the screw 9 threaded in the block 7 and swiveled in the housing 8. The screw 9 is operated by a handle 10. To suitably guide the housing 8, a pair of rods 11 are fixed to the housing 8 and pass loosely through holes in the block 7. The rods are fixed at their upper ends to a cross-bar 12 through which the screw 9 passes. When screw 9 is turned it lowers or raises shaft 4, bringing the extensions $1^b$ and $2^b$ into shearing engagement or separating them, as may be desired. It will be understood, however, that the particular mechanism shown in Fig. 4 is merely one embodiment of means for adjusting the distance between the arbors 4 and 5. The rolls are revolved by means of the arbors 4 and 5, which in turn may be driven by any suitable means (not shown).

To further assist in producing a perfectly smooth square cut, I relieve the periphery of each of the extensions $1^b$, $2^b$, by forming the rolls with slightly decreasing diameters as at $1^d$ and $2^d$, thereby producing a slight rearward clearance between the roll and the saw just back of the cutting edge. In addition to these clearances $1^d$ and $2^d$, I provide clearance grooves or recesses $1^e$ and $2^e$, to separate the stretching treads from the shearing treads.

With this improved construction, one roll provides a satisfactory crown for tensioning the saw the same as hertofore, and provides on the same roll means for shearing the blade, the shearing means being entirely independent of the tensioning part of the rolls so that even if the shearing corners $1^c$ and $2^c$ become injured there still remains a perfect roll for tensioning the saw. Furthermore, the stretching treads act as guides to assist in properly passing the material through the shearing treads, and the shearing treads also serve as guides to steady the material when the stretching treads are used. This improved roll is even less expensive to manufacture than the plain stretching roll now in common use, there being less material to be cut away in forming the roll.

What I claim as my invention and desire to secure by Letters Patent, is:—

1. A combined tensioning and shearing device comprising a pair of revolubly mounted rolls each having a crowned stretching tread, and a shearing tread formed integral with the roll at one end thereof, one of said rolls being axially adjustable with relation to the other roll.

2. A combined tensioning and shearing device comprising a pair of revolubly mounted rolls each having a crowned stretching tread, and a shearing tread formed integral with the roll at one end thereof, one of said rolls being axially adjustable with relation to the other roll, the rear part of the shearing tread of each roll being of slightly reduced diameter.

3. A combined tensioning and shearing device comprising a pair of revolubly mounted rolls each having a crowned stretching tread, and a shearing tread formed integral with the roll at one end thereof, one of said rolls being axially adjustable with relation to the other roll, said roll being formed with a clearance groove between the stretching tread of each roll and the tensioning tread.

In testimony whereof, I affix my signature in presence of two witnesses.

JOHN P. HEDSTROM.

Witnesses:
E. D. SANFORD,
H. J. HEYDENBURG.

---

Copies of this patent may be obtained for five cents each, by addressing the "Commissioner of Patents, Washington, D. C."